United States Patent [19]

Kaneko et al.

[11] Patent Number: 4,697,222
[45] Date of Patent: Sep. 29, 1987

[54] COMPOSITION FOR DIELECTRIC PORCELAIN AND DIELECTRIC PORCELAIN AND CAPACITOR BY USE OF SAID COMPOSITION

[75] Inventors: Norio Kaneko, Kashiwa; Masahito Niibe, Yokohama, both of Japan

[73] Assignee: Canon Kabushiki Kaisha, Tokyo, Japan

[21] Appl. No.: 849,825

[22] Filed: Apr. 9, 1986

[30] Foreign Application Priority Data

Apr. 12, 1985 [JP] Japan .................................. 60-78771
Apr. 12, 1985 [JP] Japan .................................. 60-78772

[51] Int. Cl.⁴ ............................................ C04B 35/46
[52] U.S. Cl. .................................... 361/321; 501/137; 501/139; 252/521

[58] Field of Search ............... 501/134, 135, 136, 137, 501/138, 139; 252/521; 361/321

[56] References Cited

U.S. PATENT DOCUMENTS

| Re. 30,313 | 6/1980 | Cavcia | 252/521 X |
| 4,010,133 | 3/1977 | Nakayama | 501/139 X |
| 4,377,840 | 3/1983 | Nair | 501/137 X |

Primary Examiner—William R. Dixon, Jr.
Assistant Examiner—A. Knab
Attorney, Agent, or Firm—Fitzpatrick, Cella, Harper & Scinto

[57] ABSTRACT

A composition for dielectric porcelain comprises $BaTiO_3$ and 1 to 5 mole % of a compound with a molar ratio of $Bi_2O_3:RuO_2=1:2$ based on said $BaTiO_3$.

12 Claims, 1 Drawing Figure

COMPOSITION FOR DIELECTRIC PORCELAIN AND DIELECTRIC PORCELAIN AND CAPACITOR BY USE OF SAID COMPOSITION

BACKGROUND OF THE INVENTION

1. Field of the Invention

This invention relates to a composition for dielectric porcelain, and a dielectric porcelain and a capacitor by use of said composition.

2. Related Background Art

In the prior art, there have been employed, as the dielectric member to be used for capacitors, etc., porcelains comprising $BaTiO_3$, $BaSnO_3$, $CaTiO_3$ or a solid solution having other components added to these double oxides as the main component, or these materials modified with various additives. However, these porcelains are required to be sintered at a high temperature of 1300° to 1400° C. and therefore, for example, when applied for a laminated capacitor, there ensues the problem that no silver type electrode can be used as the internal electrode, and it has been sought to develop a porcelain which can be sintered at lower temperatures.

Also, in the dielectric porcelain of the prior art, if the dielectric constant at around normal temperature is made greater, the temperature coefficient of dielectric constant also becomes greater; on the contrary, if the temperature coefficient of dielectric constant at around normal temperature is made smaller, the dielectric constant also becomes smaller. Thus, it has been difficult to obtain a porcelain with a great dielectric constant and a small temperature coefficient of dielectric constant.

Further, in the case when the porcelain has a strong dielectric property, the Curie point is around normal temperature due to modification with an additive, whereby mechanical strength will be lowered due to phase transfer at this temperature, and there is also involved the problem that it cannot be used as a functional element without difficulty.

SUMMARY OF THE INVENTION

An object of the present invention is to provide a composition for dielectric porcelain which can give a dielectric porcelain by sintering at a relatively low temperature, and a dielectric porcelain and a condenser by use of said composition.

Another object of the present invention is to provide a composition for dielectric porcelain which can give a dielectric porcelain which is great in dielectric constant at around room temperature and yet relatively small in dielectric loss and temperature coefficient of dielectric constant, and a dielectric porcelain and a capacitor by use of said composition.

Still another object of the present invention is to provide a composition for dielectric porcelain capable of constituting a dielectric porcelain which is free from such a problem as or lowering in mechanical strength due to phase transfer at around normal temperature and can be used advantageously as a functional element, and a dielectric porcelain and a capacitor by use of said composition.

According to an aspect of the present invention, there is provided a composition for dielectric porcelain comprising $BaTiO_3$ and 1 to 5 mole % of a compound with a molar ratio of $Bi_2O_3$:$RuO_2$=1:2 based on said $BaTiO_3$.

According to another aspect of the present invention, there is provided a composition for dielectric porcelain comprising a bismuth layer compound with a molar ratio of $Bi_2O_3$ : $TiO_2$=2:3, 1 to 10 mole % of $BaTiO_3$ based on 1 mole of said bismuth layer compound and 1 to 5 mole % of a compound with a molar ratio of $Bi_2O_3$:$RuO_2$=1:2 based on said bismuth layer compound.

According to still another aspect of the present invention, there is provided a dielectric porcelain prepared by use of the above composition for dielectric porcelain.

According to still another aspect of the present invention, there is provided a capacitor having a dielectric porcelain prepared by use of the above composition for dielectric porcelain and electrodes.

DESCRIPTION OF THE PREFERRED EMBODIMENTS

Figure 1:
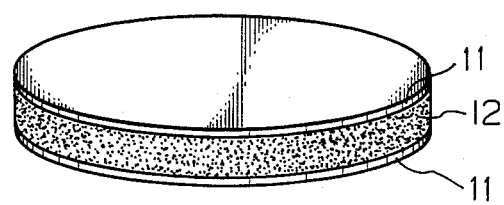
FIG. 1 is a schematic perspective view of a capacitor.

The composition for dielectric porcelain of the present invention is characterized by containing $BaTiO_3$ and 1 to 5 mole % of the compound with a molar ratio of $Bi_2O_3$:$RuO_2$=1:2 based on said $BaTiO_3$ (hereinafter called the characteristic A) or containing the bismuth layer compound with a molar ratio of $Bi_2O_3$:$TiO_2$=2:3, 1 to 10 mole of $BaTiO_3$ based on one mole of said bismuth layer compound and 1 to 5 mole % of the compound with a molar ratio of $Bi_2O_3$:$RuO_2$=1:2 based on said bismuth layer compound (hereinafter called the characteristic B). As the mode of said composition, there may be included, for example, powdery of pressed powdery mixture of the above components, and powdery or pressed powdery mixture containing compound oxides (including solid solution) obtained by subjecting a part or all of the above components to sintering, or molded products obtained by subjecting these mixtures to the steps of the film preparation method such as CVD method or the single crystal synthetic method, etc.

Also, the dielectric porcelain of the present invention is constituted of the composition for dielectric porcelain as described above.

Further, the capacitor of the present invention is constituted of the composition for dielectric porcelain as described above.

The compound with a molar ratio of $Bi_2O_3$:$RuO_2$=1:2 according to the present invention should preferably be a bismuth type pyrochroite type compound. This has a structure in which rows of octahedra linked in the [110] direction and those in the [110] direction are laminated alternately on one another.

The bismuth layer compound according to the present invention has a structure in which $BiO_2^-$ layer is inserted per some layers of perovskite structure.

In the composition for dielectric porcelain having the above characteristic A of the present invention, the compound with a molar ratio of $Bi_2O_3$:$RuO_2$=1:2 is contained at a ratio within the above numerical range based on $BaTiO_3$ for the following reasons.

If the compound with a molar ratio of $Bi_2O_3$:$RuO_2$=1:2 is contained in an amount less than 1 mole % based on $BaTiO_3$, the dielectric constant will be lowered.

If the compound with a molar ratio of $Bi_2O_3$:$RuO_2$=1:2 is contained in an amount exceeding 5 mole % based on $BaTiO_3$, dielectric constant will be lowered simultaneously with lowering in sintering characteristic.

In the composition for dielectric porcelain having the above characteristic B of the present invention, $BaTiO_3$ and the compound with a molar ratio of $Bi_2O_3$:$RuO_2 = 1:2$ are contained at ratios within the above numerical ranges based on the bismuth layer compound with a molar ratio of $Bi_2O_3$:$TiO_2 = 2:3$ for the following reasons.

If $BaTiO_3$ is less than 1 mole per 1 mole of the above bismuth layer compound, dielectric constant will be lowered.

If $BaTiO_3$ is contained in an amount exceeding 5 mole %, the sintering temperature will be elevated and sintering characteristic is lowered.

If the compound with a molar ratio of $Bi_2O_3$:$RuO_2 = 1:2$ is less than 1 mole % based on the above bismuth layer compound, dielectric constant will be lowered.

If the compound with a molar ratio of $Bi_2O_3$:$RuO_2 = 1:2$ is contained in an amount exceeding 5 mole % based on the above bismuth layer compound, dielectric constant will be lowered and also dielectric loss is increased, simultaneously with lowering in sintering characteristic.

The dielectric porcelain and the capacitor in the present invention are prepared by use of the composition for dielectric porcelain as described above.

The composition for dielectric porcelain having the characteristic A and the dielectric porcelain by use of said composition of the present invention may further contain 5 mole % or less of rare earth element oxide based on $BaTiO_3$ which is the component of said composition and dielectric porcelain.

Also, the composition for dielectric porcelain having the characteristic A and the dielectric porcelain by use of said composition of the present invention may further contain 5 mole % or less of at least one compound selected from $Bi_4Ti_3O_{12}$, $PbBi_4Ti_4O_{15}$, $SrBi_4Ti_4O_{15}$, $BaBi_4Ti_4O_{15}$ and $Ba_2Bi_4Ti_5O_{18}$ based on $BaTiO_3$ which is the component of said composition and dielectric porcelain. Here, even when the above additives are used plurally, the sum of the moles thereof should be 5 mole % or less.

Also, the composition for dielectric porcelain having the characteristic B of the present invention and the dielectric porcelain by use of said composition may further contain 5 mole % or less of a rare earth element oxide based on the bismuth layer compound which is the component of said composition and dielectric porcelain.

The above additives are added for controlling dielectric characteristics such as dielectric constant, temperature coefficient of dielectric constant, exhibition, promotion and aiding of strong dielectric property, etc., and phase transfer temperature.

Also, in the composition for dielectric porcelain having the characteristic B of the present invention and the dielectric porcelain by use of said composition, 5 mole % or less of at least one compound selected from PbO, $CaCO_3$ and $SrCO_3$ may be further added based on the bismuth layer compound which is the component of said composition and dielectric porcelain.

[EXAMPLES]

The respective starting materials were weighed and mixed in a wet system so that the dielectric porcelains with the compositional ratios shown in Table 1 and Table 3 could be obtained. After drying the mixture, the reaction temperature thereof was determined according to differential thermal analysis. After the above mixture was provisionally fired at the temperature 100° C. higher than said reaction temperature for 2 hours, it was ground in a wet system in a ball mill. The ground product was mixed with polyvinyl alcohol as the binder, pressure molded into discs of 11 m m in diameter and 5 mm in thickness, which were further sintered at the temperature indicated in Table 2 and Table 4 higher by 100° C. than the provisional firing temperature for 5 hours. The sintered product was attached with silver on both surfaces by the vacuum vapor deposition method to form a capacitor as shown in FIG. 1, and the electrical characteristics of respective capacitors were measured. FIG. 1 shows a schematic perspective view of a capacitor, in which 11's show electrodes and 12 is a dielectric porcelain sample. First, specific dielectric constant and dielectric loss (tan δ) of the dielectric porcelain sample were measured at a frequency of 1 MHz and 25° C.

Also, the change rate of specific dielectric constant at temperatures of 50° C., 80° C. and 120° C. was measured at a frequency of 1 MHz for each sample compared to the value at 25° C. as the standard. The results are shown in Table 2 and Table 4.

TABLE 1

| Sample No. | $BaTiO_3$*1 | $Bi_2Ru_2O_7$*2 | Composition (molar ratio) Additive*3 |
|---|---|---|---|
| 1*4 | 100 | — | $Bi_4Ti_3O_{12}$ 2 |
| 2*4 | 100 | — | $SrBi_4Ti_4O_{15}$ 4 |
| 3 | 100 | 1 | — |
| 4 | 100 | 5 | — |
| 5 | 100 | 1 | $Pr_2O_3$ 1 |
| 6 | 100 | 3 | $Pr_2O_3$, $CeO_2$ 1 1 |
| 7 | 100 | 5 | $CeO_2$, $La_2O_3$ 1 1 |
| 8 | 100 | 1 | $Bi_4Ti_3O_{12}$ 2 |
| 9 | 100 | 3 | $PbBi_4Ti_4O_{15}$ 2 |
| 10 | 100 | 1 | $SrBi_4Ti_4O_{15}$ 1 |
| 11 | 100 | 1 | $BaBi_4Ti_4O_{15}$ 3 |
| 12 | 100 | 1 | $BaBi_4Ti_4O_{18}$ 3 |
| 13 | 100 | 1 | $BaBi_4Ti_4O_{15}$, $Ba_2Bi_4Ti_5O_{18}$ 1.5  1.5 |
| 14 | 100 | 2 | — |
| 15 | 100 | 3 | — |
| 16 | 100 | 4 | — |

*1Compound with a molar ratio of $BaO$:$TiO_2 = 1:1$
*2Bismuth layer compound with a molar ratio of $Bi_2O_3$:$RuO_2 = 1:2$
*3Upper part indicates additive, lower part its molar ratio
*4Control (not included in the present invention)

TABLE 2

| Sample No. | Sintering temperature (°C.) | Specific dielectric constant (1 MHz) (25° C.) | Dielectric loss (tan δ) (%) | Temperature change ratio of specific dielectric constant (%) | | |
|---|---|---|---|---|---|---|
| | | | | 50° C. | 80° C. | 120° C. |
| 1* | 1300 | 2000 | 1.3 | +1.95 | +3.82 | +6.18 |
| 2* | 1350 | 2200 | 1.8 | −3.6 | −9.5 | −12.8 |
| 3 | 1150 | 240 | 0.90 | +0.02 | +0.05 | +0.07 |
| 4 | 1150 | 260 | 0.92 | +0.06 | +0.11 | +0.16 |
| 5 | 1100 | 360 | 0.64 | +0.03 | +0.05 | +0.07 |
| 6 | 1140 | 300 | 0.71 | +0.02 | +0.03 | +0.05 |
| 7 | 1110 | 430 | 0.76 | +0.04 | +0.07 | +0.09 |
| 8 | 1150 | 1700 | 0.59 | +0.21 | +0.46 | +0.66 |
| 9 | 1050 | 1900 | 0.67 | +0.52 | +0.96 | +1.22 |
| 10 | 1190 | 2200 | 0.86 | −0.09 | −0.28 | −0.50 |
| 11 | 1200 | 2000 | 0.98 | +0.95 | +1.89 | +2.43 |

TABLE 2-continued

| Sample No. | Sintering temperature (°C.) | Specific dielectric constant (1 MHz) (25° C.) | Dielectric loss (tan δ) (%) | Temperature change ratio of specific dielectric constant (%) | | |
|---|---|---|---|---|---|---|
| | | | | 50° C. | 80° C. | 120° C. |
| 12 | 1210 | 2400 | 1.2 | +1.50 | +3.20 | +5.78 |
| 13 | 1200 | 2300 | 1.1 | +1.30 | +2.64 | +4.54 |
| 14 | 1200 | 240 | 0.90 | +0.02 | +0.07 | +0.09 |
| 15 | 1200 | 250 | 0.90 | +0.03 | +0.07 | +0.10 |
| 16 | 1180 | 260 | 0.91 | +0.06 | +0.09 | +0.14 |

*Control (not included in the present invention)

TABLE 3

| Sample No. | Composition (molar ratio) | | | |
|---|---|---|---|---|
| | $Bi_4Ti_3O_{12}$*[1] | $BaTiO_3$ | $Bi_2Ru_2O_7$*[2] | Additive*[3] |
| 101*[4] | 1 | 1 | — | — |
| 102*[4] | 1 | 2 | — | — |
| 103 | 1 | 1 | 0.01 | — |
| 104 | 1 | 2 | 0.03 | — |
| 105 | 1 | 1 | 0.01 | $Pr_2O_3$ 0.01 |
| 106 | 1 | 1 | 0.01 | $CeO_2$ 0.01 |
| 107 | 1 | 1 | 0.01 | $La_2O_3$ 0.02 |
| 108 | 1 | 2 | 0.02 | $Pr_2O_3$ 0.01 |
| 109 | 1 | 2 | 0.02 | $CeO_2$ 0.01 |
| 110 | 1 | 3 | 0.01 | $La_2O_3$ 0.03 |
| 111 | 1 | 10 | 0.01 | — |
| 112 | 1 | 10 | 0.01 | $CeO_2$ 0.04 |
| 113 | 1 | 5 | 0.01 | $Pr_2O_3$ 0.03 |
| 114 | 1 | 2 | 0.03 | PbO 0.01 |
| 115 | 1 | 2 | 0.01 | PbO, $CaCO_3$ 0.01 0.02 |
| 116 | 1 | 5 | 0.02 | $SrCO_3$ 0.05 |
| 117 | 1 | 9 | 0.01 | PbO, $SrCO_3$ 0.05 0.05 |
| 118 | 1 | 8 | 0.05 | PbO, $CaCO_3$ 0.01 0.01 |
| 119 | 1 | 1 | 0.03 | — |
| 120 | 1 | 1 | 0.05 | — |
| 121 | 1 | 2 | 0.01 | — |
| 122 | 1 | 2 | 0.05 | — |
| 123 | 1 | 5 | 0.01 | — |
| 124 | 1 | 5 | 0.03 | — |
| 125 | 1 | 5 | 0.05 | — |
| 126 | 1 | 10 | 0.03 | — |
| 127 | 1 | 10 | 0.05 | — |

*[1] Bismuth layer compound with a molar ratio of $Bi_2O_3:TiO_2 = 2:3$
*[2] Bismuth type pyrochroite compound with a molar ratio of $Bi_2O_3:RuO_2 = 1:2$
*[3] Upper part indicates additive, lower part its molar ratio
*[4] Control (not included in the present invention)

TABLE 4

| Sample No. | Sintering temperature (°C.) | Specific dielectric constant (1 MHz) (25° C.) | Dielectric loss (tan δ) (%) | Temperature change ratio of specific dielectric constant (%) | | |
|---|---|---|---|---|---|---|
| | | | | 50° C. | 80° C. | 120° C. |
| 101* | 1250 | 150 | 0.96 | +0.45 | +0.89 | +1.37 |
| 102* | 1300 | 350 | 1.95 | +0.76 | +1.53 | +2.26 |
| 103 | 1050 | 130 | 0.63 | +0.03 | +0.09 | +0.13 |
| 104 | 1150 | 260 | 0.99 | +0.06 | +0.14 | +0.21 |
| 105 | 1140 | 230 | 0.65 | +0.11 | +0.23 | +0.33 |
| 106 | 1150 | 220 | 0.89 | +0.13 | +0.24 | +0.31 |
| 107 | 1110 | 270 | 0.75 | +0.19 | +0.42 | +0.61 |
| 108 | 1160 | 390 | 1.01 | +0.37 | +0.62 | +0.86 |
| 109 | 1150 | 370 | 0.92 | +0.29 | +0.65 | +0.96 |
| 110 | 1150 | 440 | 0.96 | +0.02 | +0.06 | +0.09 |
| 111 | 1150 | 920 | 1.31 | +0.39 | +0.73 | +1.09 |
| 112 | 1140 | 870 | 1.53 | +0.36 | +0.69 | +0.97 |
| 113 | 1150 | 680 | 0.94 | +0.29 | +0.43 | +0.59 |
| 114 | 1100 | 380 | 0.73 | +0.09 | +0.12 | +0.16 |
| 115 | 1160 | 520 | 1.19 | +0.38 | +0.77 | +1.16 |
| 116 | 1150 | 730 | 1.50 | −0.22 | −0.56 | −0.92 |
| 117 | 1150 | 820 | 1.33 | +0.03 | +0.06 | +0.11 |
| 118 | 1200 | 890 | 1.69 | −0.09 | −1.18 | −0.26 |
| 119 | 1050 | 150 | 0.71 | +0.04 | +0.09 | +0.15 |
| 120 | 1100 | 190 | 0.82 | +0.05 | +0.14 | +0.19 |
| 121 | 1200 | 240 | 0.90 | +0.05 | +0.10 | +0.18 |
| 122 | 1200 | 280 | 0.99 | +0.10 | +0.18 | +0.26 |
| 123 | 1150 | 830 | 1.15 | +0.20 | +0.40 | +0.85 |
| 124 | 1150 | 880 | 1.60 | +0.39 | +0.72 | +1.19 |
| 125 | 1200 | 890 | 1.62 | +0.42 | +0.81 | +1.45 |
| 126 | 1150 | 950 | 1.50 | +0.51 | +0.91 | +1.62 |
| 127 | 1150 | 970 | 1.68 | +0.55 | +1.10 | +1.59 |

*Control (not included in the present invention)

As is apparent from Table 2 and Table 4, the samples No. 3 to No. 16 and No. 103 to No. 127 which are dielectric procelains according to the present invention can be varied in dielectric constant in practical region, and the sintering temperature was also lower as compared with the porcelains of the prior art. Also, it was found that the dielectric loss characteristic (tan δ) could be improved, with the temperature coefficient of dielectric constant being small.

As can be clearly seen from the above detailed description, particularly from the Examples, according to the composition for dielectric porcelain of the present invention, dielectric porcelains can be obtained by sintering at a relatively low temperature. Therefore, for example, when applied for a laminated ceramic capacitor, silver type electrodes can be used as the internal electrode, which can contribute much to lowered cost. Besides, since the dielectric constant at around normal temperature which is the temperature used for dielectric members is great, it can contribute to minituarization of a capacitor to be of great utilization value in industry. At the same time, due to small temperature coefficient of dielectric constant at around normal temperature, stable performance can be exhibited with high reliability, and yet there is no problem of lowering in mechanical strength due to phase transfer at around normal temperature, and therefore it can be utilized effectively as a functional element.

We claim:

1. A composition for dielectric porcelain comprising $BaTiO_3$ and 1 to 5 mole % of a compound with a molar ratio of $Bi_2O_3:RuO_2=1:2$ based on said $BaTiO_3$.

2. A composition for dielecetric porcelain according to claim 1, wherein the compound with a molar ratio of $Bi_2O_3:RuO_2$ is a bismuth type pyrochroite compound.

3. A composition for dielectric porcelain according to claim 1, further containing 5 mole % or less of a rare earth metal oxide based on said $BaTiO_3$.

4. A composition for dielectric porcelain according to claim 3, further containing 5 mole % or less of a compound selected from among $Bi_4Ti_3O_{12}$, $PbBi_4Ti_4O_{15}$, $SrBi_4Ti_4O_{15}$, $BaBi_4Ti_4O_{15}$ and $Ba_2Bi_4Ti_5O_{18}$ based on said $BaTiO_3$.

5. A composition for dielectric porcelain comprising a bismuth layer compound with a molar ratio of $Bi_2O_3:TiO_2=2:3$, 1 to 10 modes of $BaTiO_3$ based on 1 mole of said bismuth layer compound and 1 to 5 mole % of a compound with a molar ratio of $Bi_2O_3:RuO_2=1:2$ based on said bismuth layer compound.

6. A composition for dielectric porcelain according to claim 5, wherein the compound with a molar ratio of $Bi_2O_3:RuO_2$ is bismuth type pyrochroite compound.

7. A composition for dielectric porcelain according to claim 5, further containing 5 mole % or less of a rare earth metal oxide based on said bismuth layer compound.

8. A composition for dielectric porcelain according to claim 5, further containing 5 mole % or less of a compound selected from among PbO, $CaCO_3$ and $SrCO_3$ based on said bismuth layer compound.

9. A dielectric porcelain comprising $BaTiO_3$ and 1 to 5 mole % of a compound with a molar ratio of $Bi_2O_3:RuO_2=1:2$ based on said $BaTiO_3$.

10. A dielectric porcelain comprising a bismuth layer compound with a molar ratio of $Bi_2O_3:TiO_2=2;3$, 1 to 10 moles of $BaTiO_3$ based on 1 mole of said bismuth layer compound and 1 to 5 mole % of a compound with a molar ratio of $Bi_2O_3:RuO_2=1:2$ based on said bismuth layer compound.

11. A capacitor having electrodes and a molded dielectric porcelain comprising $BaTiO_3$ and 1 to 5 mole % of a compound with a molar ratio of $Bi_2O_3:RuO_2=1:2$ based on said $BaTiO_3$.

12. A capacitor having electrodes and a molded dielectric porcelain comprising a bismuth layer compound with a molar ratio of $Bi_2O_3:TiO_2=2:3$, 1 to 10 moles of $BaTiO_3$ based on 1 mole of said bismuth layer compound and 1 to 5 mole % of a compound with a molar ratio of $Bi_2O_3:RuO_2=1:2$ based on bismuth layer compound.

* * * * *

UNITED STATES PATENT AND TRADEMARK OFFICE
CERTIFICATE OF CORRECTION

PATENT NO. : 4,697,222
DATED : September 29, 1987
INVENTOR(S) : NORIO KANEKO, ET AL.

It is certified that error appears in the above-identified patent and that said Letters Patent is hereby corrected as shown below:

COLUMN 1

Line 57, delete "or".

COLUMN 2

Line 30, "of" should read --or--.

COLUMN 4

Line 1, "100° C." should read --50° C.--.
Line 5, "11 m m" should read --11 mm--.
Line 7, delete "higher by".
Line 8, "100° C. than" should read --100° C. higher than--.

COLUMN 6

Line 54, "dielecetric" should read --dielectric--.
Line 68, "modes" should read --moles--.

UNITED STATES PATENT AND TRADEMARK OFFICE
CERTIFICATE OF CORRECTION

PATENT NO. : 4,697,222
DATED : September 29, 1987
INVENTOR(S) : NORIO KANEKO, ET AL.

It is certified that error appears in the above-identified patent and that said Letters Patent is hereby corrected as shown below:

COLUMN 8

Line 2, "$Bi_2O_3:TiO_2=2;3,$" should read --$Bi_2O_3:TiO_2=2:3,$--.
Line 16, "on bismuth" should read --on said bismuth--.

Signed and Sealed this

Twenty-second Day of March, 1988

Attest:

DONALD J. QUIGG

Attesting Officer     Commissioner of Patents and Trademarks